UNITED STATES PATENT OFFICE.

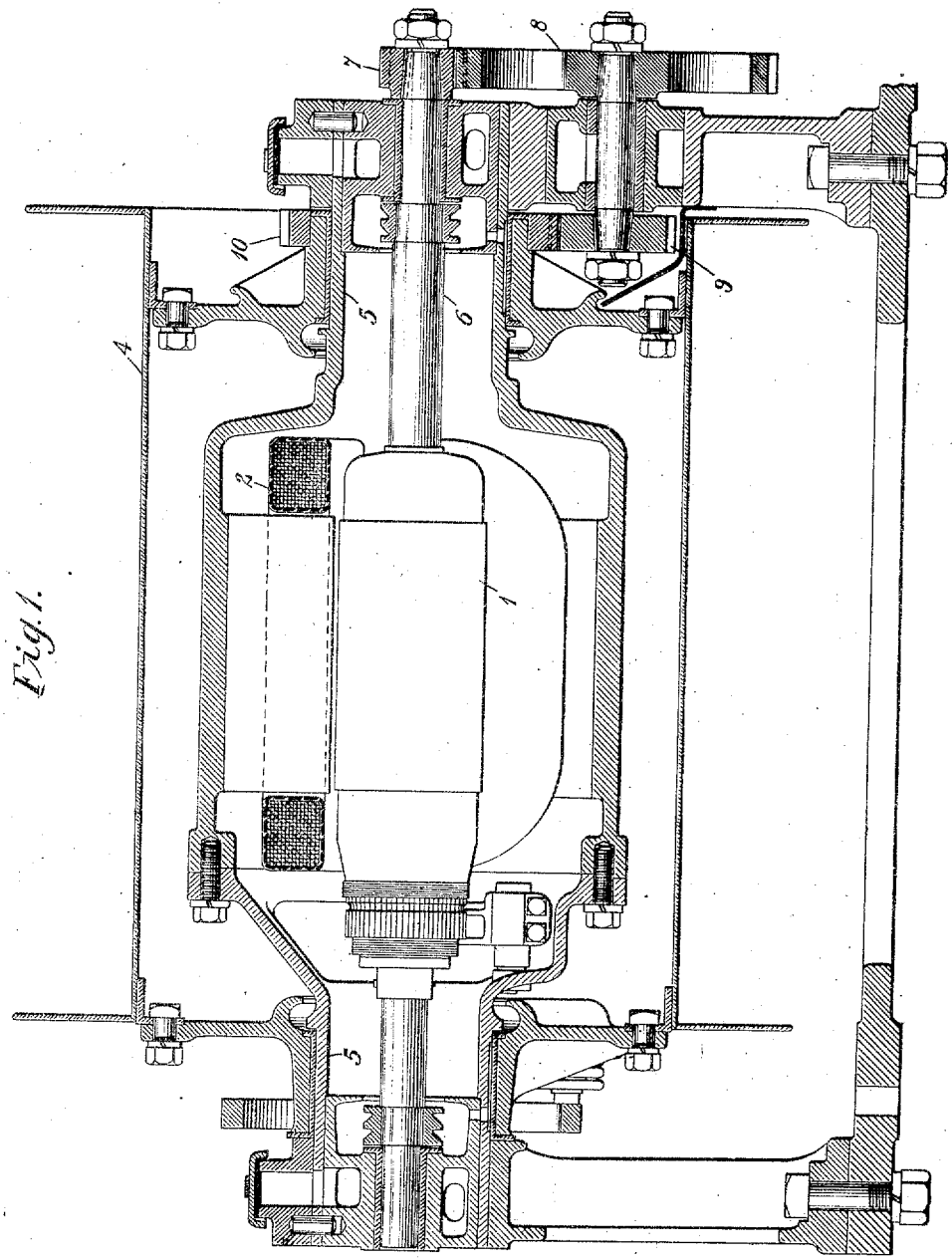

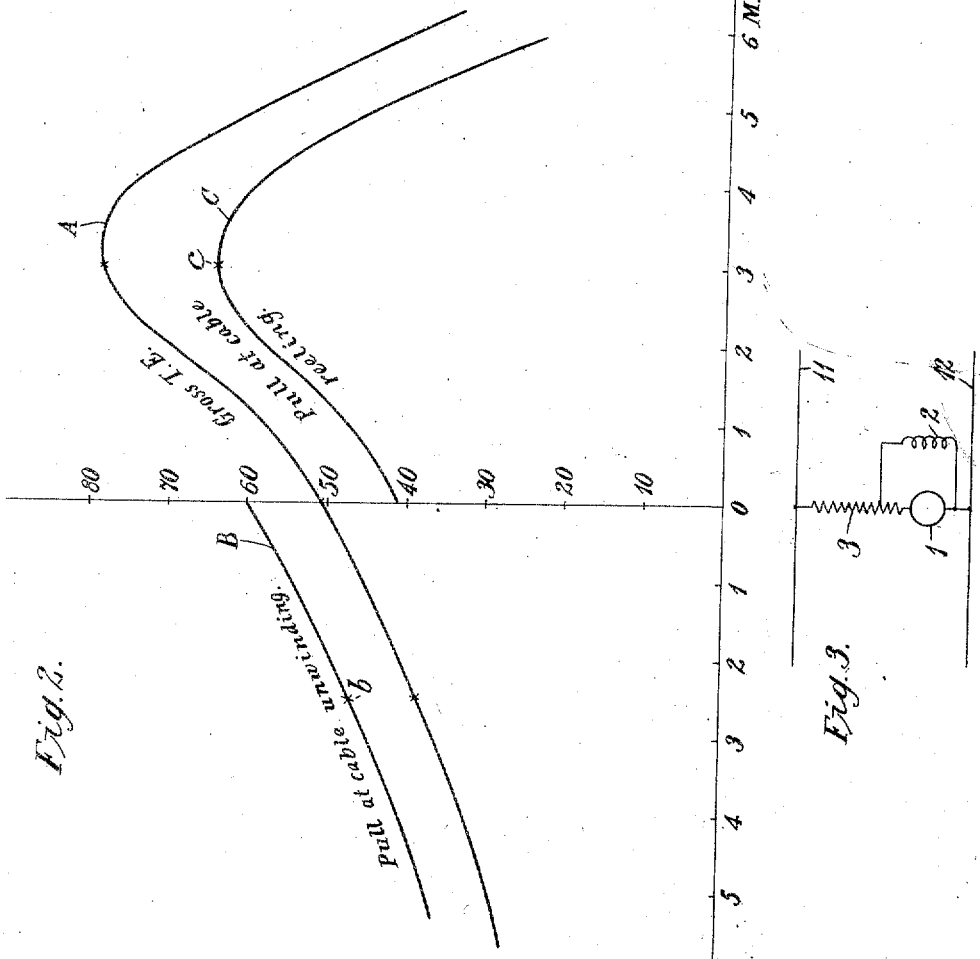

JOSEPH LE CONTE DAVIS, OF PITTSBURGH, PENNSYLVANIA, ASSIGNOR TO WESTINGHOUSE ELECTRIC AND MANUFACTURING COMPANY, A CORPORATION OF PENNSYLVANIA.

MOTOR FOR LOCOMOTIVE GATHERING-REELS.

1,206,309.  Specification of Letters Patent.  Patented Nov. 28, 1916.

Application filed March 2, 1912. Serial No. 681,268.

*To all whom it may concern:*

Be it known that I, JOSEPH LE CONTE DAVIS, a citizen of the United States, and a resident of Pittsburgh, in the county of Allegheny and State of Pennsylvania, have invented a new and useful Improvement in Motors for Locomotive Gathering-Reels, of which the following is a specification.

My invention relates to gathering reels for mining locomotives and similar devices and it has special reference to electric motor driven reels of this character.

The object of my invention is to provide a reel of the class above indicated and an electric motor which is specially adapted for operating the same.

Another object of my invention is to provide a motor driven gathering reel for mining locomotives for the purpose of reeling in or gathering a rope or cable when the locomotive is advanced in a forward direction toward the cable and for permitting a restricted paying out of cable when the locomotive is operated in the opposite direction away from the cable.

A still further object of my invention is to provide a gathering reel that is operatively associated with an electric motor that produces a unidirectional torque, irrespective of the direction of operation of the locomotive or whether the reel is gathering the cable or paying it out. During the gathering operation the motor drives the reel for winding up the cable, while in paying out, the tension of the cable serves to rotate the reel in the reverse direction in opposition to the motor torque, thus preventing the cable from being run out freely.

More specifically stated, my invention contemplates the employment of a reel motor that is especially designed for torque characteristics having a definite relation to the normal running speed of mining locomotives when performing the service of gathering and paying out cables, and, moreover, to have increasing torque characteristics during the forward operation to insure a taut cable and prevent its being run over, and decreasing torque characteristics during the backward paying out operation to maintain the cable under a slight tension without permitting a sufficient strain upon it to cause a breakage thereof.

It is well known that the operating conditions for mining locomotives of the type under consideration are very bad, and therefore the operation of such locomotives is limited to relatively low speeds when gathering and paying out cable. With this normal speed of operation in mind, the motor is designed so that the torque during both operations is proper to meet the peculiarities of the service, whereby the results hereinbefore mentioned are accomplished.

In co-pending application, Serial No. 649,983, filed September 18, 1911 by George M. Eaton and myself, is shown and described a locomotive gathering reel having an independent driving motor mounted within the drum of the reel and operatively connected to it by suitable gearing.

While the aim of my present invention is to provide an electric motor having characteristics which peculiarly adapt it for driving gathering reels, it is not restricted in its field of usefulness to any particular type of reel, although I prefer to utilize the arrangement and gearing shown in the above-named Eaton and Davis application.

Figure 1 of the accompanying drawings is a sectional elevation of an electric motor-driven gathering reel. Fig. 2 is a diagram setting forth, by means of curves, the motor torque, the pull exerted on the rope or cable when unwinding, and the pull exerted on the rope or cable when reeling, plotted against the speed, in miles per hour, of the locomotive on which the gathering reel is mounted. Fig. 3 is a diagram illustrating the circuit connections whereby the desired motor characteristics are secured.

Referring to the drawings, the electric motor here shown comprises a rotatable armature 1, a field magnet winding 2 and a resistor 3.

The motor is adapted to drive a reel or drum 4 which, as illustrated in Fig. 1, is rotatively mounted on cylindrical projections 5 of the motor end frames and is geared to the motor shaft 6 by gear wheels 7, 8, 9 and 10.

The motor is supplied with energy from any suitable constant-potential source of energy, through line conductors 11 and 12 across which the armature 1 and the resistor 3 are connected in series relation. The field magnet winding 2 is connected in shunt relation to the armature 1 and a portion of the resistor 3, as clearly shown in Fig. 3. The effect of this arrangement and these connections is to produce characteristics, which peculiarly adapt the motor for operating a locomotive gathering reel. These characteristics are set forth in the curves of Fig. 2, to which special reference may now be had. The curve A indicates the motor torque for various locomotive speeds in a forward and a backward direction.

Assuming that the gathering reel motor is continuously supplied with electrical energy from the line conductors 11 and 12, as is customary in this class of apparatus, and that the locomotive is at a standstill, a relatively heavy current flows through the series circuit comprising the resistor 3 and the armature 1, and a relatively light current traverses the field magnet winding 2, since by far the major portion of the voltage applied to the above-mentioned series circuit is absorbed in the resistor 3, by reason of the very low resistance of the armature winding, as will be understood. The motor torque which, as is well known, is proportional to the product of field magnetic flux and the co-acting armature current, assumes, consequently, a predetermined value which may be represented by the letter "T".

Whenever the gathering reel motor is rotating in the direction in which it tends to move, that is, when the cable is being reeled in, a counter E. M. F. is set up in the armature and, as a result, the series circuit current is considerably reduced. However, the greater part of the line voltage is now impressed across the armature, on account of the small IR drop in the resistor 3. The voltage across the field magnet winding 2 is, therefore, greatly increased and the resultant increased field flux in conjunction with the armature current produces a torque greater than T, as indicated by curve A.

When the reel motor is being rotated in opposition to its own torque, that is, when the cable is being paid out, the E. M. F. generated in the machine is in the same direction as the line E. M. F. Consequently, a heavy current again flows through the resistor 3 and the armature 1, nearly all of the line voltage being consumed in the resistor, for the following reason. On account of the mutual assistance of the line and generated E. M. F's., a very low armature voltage is obtained, in fact one that is merely sufficient to drive the requisite current through the armature. As a result, a very low E. M. F. is impressed across the field terminals, and a very weak field flux is produced. The machine torque therefore assumes a value somewhat less than T, and gradually falls off as the speed is increased, as again indicated by curve A, by reason of the continual weakening of the field flux.

It is evident that the friction in the bearings of the reel and in the driving gears acts in opposition to the motor and, consequently, must be subtracted from the motor torque while the locomotive travels in the direction adapted to reel in the cable; whereas, when the cable is being paid out, the force thereon must not only be sufficient to overcome the opposing motor torque, but must also overcome the resisting friction losses in the reel, as indicated by curve B.

When the locomotive is traveling in a forward direction and the reel is gathering the cable, the torque of the reel motor and the pull on the cable are preferably increased with the speed, in order to insure a taut cable and avoid the possibility of the locomotive wheels passing over or damaging it. On the other hand, the torque of the reel motor should decrease as the speed of the locomotive increases in a backward direction in order to avoid rupturing or straining the cable, while maintaining it reasonably tight and preventing it from being run out too freely.

The curve C (Fig. 2) clearly indicates that the pull at the cable increases with the forwardly increasing locomotive speed to a point $c$, which corresponds to full speed with the reel in operation.

The curve B shows that the pull at the cable decreases with the backwardly increasing locomotive speed to a point $b$, which corresponds to full speed with the reel in operation.

It is therefore evident that, by the use of my gathering reel motor, ideal conditions are approximated for both directions of locomotive operation.

In its broadest aspect, my invention is not restricted to the particular structural details, arrangements and locations of parts and circuit connections and mode of operation herein set forth. Moreover, in some cases, the locomotive may be maintained at rest and the cable may be moved relative thereto. Furthermore, my invention is applicable to other fields of service in which a unidirectional torque motor is adapted to act upon a mechanical load or to be acted upon thereby, provided the motor and the load are bodily movable with respect the one to the other.

I claim as my invention:

1. The combination with a cable and a gathering reel therefor, of an electric motor for continuously exerting a unidirectional torque upon said reel and having an armature upon which a predetermined load-varying voltage is impressed and a field magnet winding upon which a differing voltage is impressed.

2. The combination with a cable and a gathering reel therefor, of an electric motor for continuously exerting a pull on said cable in one direction that varies with the winding speed thereof and having an armature, a resistor in series therewith, and a field magnet winding in shunt circuit relation to the armature and a portion of the resistor.

3. The combination with a locomotive gathering reel, of an electric motor comprising an armature, a resistor connected in series therewith and a field magnet winding connected in shunt relation to the armature and a portion of the resistor and adapted to exert a decreasing torque on said reel as the locomotive speed increases in one direction and an increasing torque thereon as the locomotive speed increases in the opposite direction.

4. The combination with an electric motor mounted transversely upon a movable body and comprising an armature, a resistor connected in series relation therewith, and a field-magnet winding entirely connected between the free terminal of the armature and a permanent intermediate point in the resistor, of a mechanical load that turns the motor armature during its lateral movement in one direction and is operated by the motor during its lateral movement in the opposite direction.

5. The combination with a locomotive gathering reel, of an electric motor comprising an armature, a resistor connected in series therewith and a field magnet winding connected in shunt relation to the armature and a portion of the resistor and adapted to evert a decreasing torque on said reel as the locomotive speed increases in a direction to unreel the cable and an increasing torque thereon as the locomotive speed increases in a direction to reel the cable.

6. The combination with an electric motor mounted upon a forwardly and backwardly movable body and comprising an armature, a resistor connected in series relation therewith, and a field-magnet winding connected across the armature and a portion of said resistor and characterized by a torque that substantially varies directly with the speed in one direction of rotation and inversely with the speed in the opposite direction, of a mechanical load that turns the motor armature when the motor is moved bodily in one direction and is operated by the motor when moved in the opposite direction.

7. The combination with an electric motor mounted transversely upon a movable body and comprising an armature, a resistor permanently connected in series relation therewith and a field-magnet winding connected across the armature and a portion of said resistor and characterized by a torque that substantially varies directly with the speed in its natural direction of rotation and inversely with the speed in the opposite direction, of a mechanical load that overcomes the diminishing motor torque when the motor is moved laterally in one direction and is overcome by the increasing torque when the motor is moved laterally in the other direction.

8. The combination with a source of energy, of an electric motor mounted upon a forwardly and backwardly movable body and comprising an armature, a resistor connected in series relation therewith and a field-magnet winding permanently connected across the armature and a predetermined portion of said resistor, whereby the voltage of said source is apportioned to produce a resultant motor torque that increases with forward running speed and decreases with backward running speed, of a mechanical load that is acted upon by said motor during its forward movement and acts upon said motor to produce rotative movements thereof when the motor is moved in a backward direction.

9. The combination with a source of energy, an electric motor comprising an armature, a resistor connected in series relation therewith and a field magnet winding permanently connected across the armature and a predetermined portion of said resistor, whereby the voltages respectively impressed upon the armature and field windings substantially vary inversely with the motor current, of a mechanical load having relative translative movement with respect to said motor and adapted to be acted upon by said motor during relative translative movement in one direction and to act upon said motor to effect rotative movements of said armature during relative translative movement in the opposite direction.

10. In an electric vehicle, the combination with a source of energy, a supply cable connected to said source, a gathering reel for said cable, and an electric motor associated therewith and comprising an armature, a resistor connected in series relation therewith and a field magnet winding connected across the armature and a predetermined portion of said resistor, all circuits of said motor being unidirectionally energized from said source, irrespective of the direction of armature rotation, whereby the voltages respectively impressed upon the armature and field windings vary substantially inversely with the motor current to produce a pull on said cable that increases with the speed of natural rotation of the motor when reeling in, and decreases with an increase of motor speed in the opposite direction when paying out said cable.

11. The combination with an electric motor for producing a unidirectional torque and having an armature, a resistor in series therewith and a field magnet winding in shunt circuit relation to the armature and a portion of the resistor, of a mechanical load adapted to act upon said motor to turn said armature against the motor torque and to be acted upon by said motor during its normal operation, said motor and said load being adapted for relative bodily movement with respect the one to the other.

12. The combination of an electric motor and a mechanical load adapted for relative bodily movement in opposite directions with respect the one to the other, said load being adapted to be acted upon by said motor during relative movement in one direction and to act upon said motor to drive it during relative movement in the opposite direction, and said motor being adapted to produce a decreasing torque when acted upon by the load and an increasing torque when acting upon said load.

13. In a locomotive adapted to be operated in opposite directions, the combination with an electric motor comprising an armature, a resistor in series relation therewith and a field-magnet winding connected across said armature and a portion of said resistor, said motor being adapted to exert different torques in accordance with the direction of movement of said locomotive, of a mechanical load associated with said motor that turns the motor armature during one direction of movement of said locomotive and is operated by said motor in the opposite direction of movement thereof.

In testimony whereof, I have hereunto subscribed my name this 24th day of February, 1912.

JOSEPH LE CONTE DAVIS.

Witnesses:
    JOHN S. DEAN,
    B. B. HINES.